June 13, 1939.   M. H. SUNDEM   2,162,186
TRACTION CHAIN FASTENER
Filed June 4, 1938
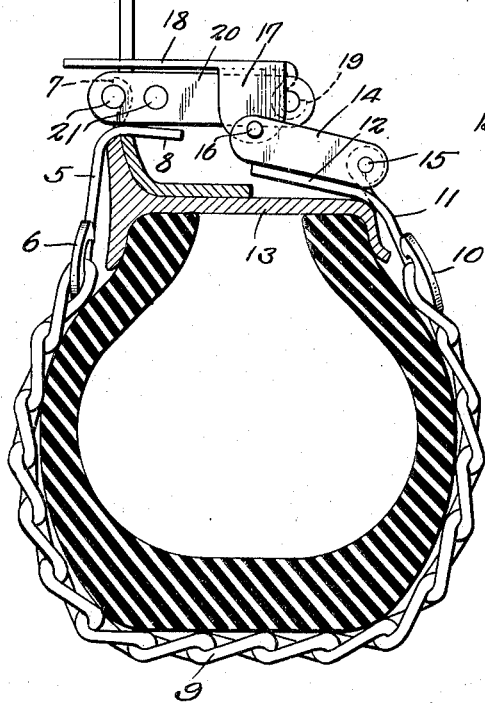
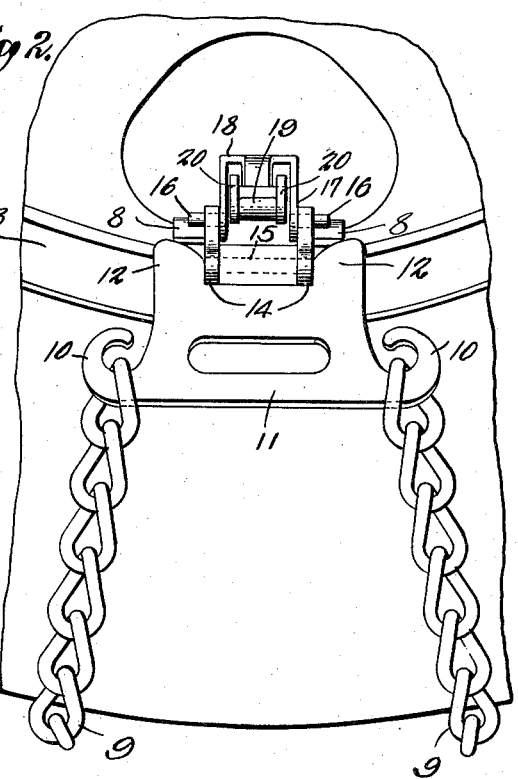
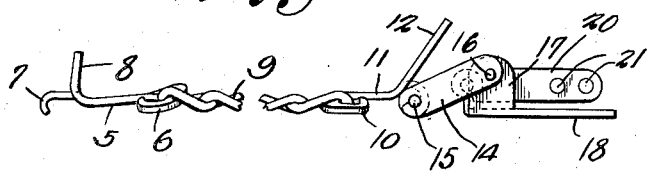
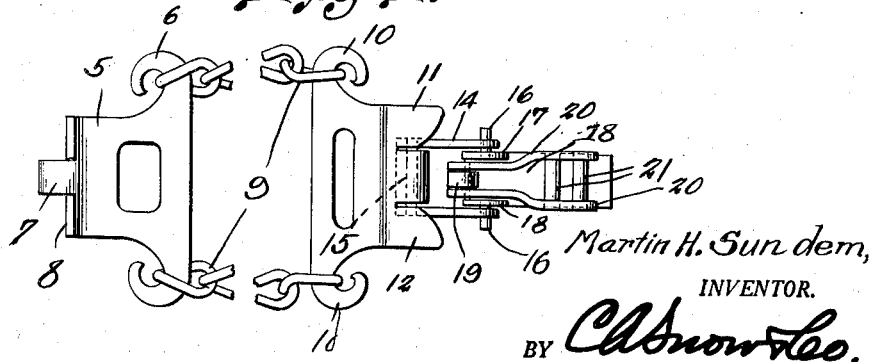
Martin H. Sundem,
INVENTOR.
BY *C. A. Snow & Co.*
ATTORNEYS.

Patented June 13, 1939

2,162,186

UNITED STATES PATENT OFFICE 2,162,186

TRACTION CHAIN FASTENER

Martin H. Sundem, Vancouver, Wash.

Application June 4, 1938, Serial No. 211,920

1 Claim. (Cl. 152—233)

This invention relates to traction chains designed primarily for use in an emergency, where it becomes necessary to use chains or shoes to increase traction of the wheels of a motor vehicle, so that the wheels may operate to move the vehicle.

An important object of the invention is to provide a traction chain of this character which may be readily and easily mounted on a motor vehicle wheel, without the necessity of jacking up the wheel, in order to position the chain.

A further object of the invention is the provision of a securing means for securing the ends of the traction chain, the construction of the securing means being such as to securely hold the chain to the wheel, due consideration having been given to the construction of the securing means to insure the ready and easy mounting of the chain.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a sectional view through a rim and tire, illustrating a traction chain, constructed in accordance with the invention, as applied thereto.

Figure 2 is a side elevational view of a traction chain applied.

Figure 3 is an elevational view of a traction chain, showing the same in an open position ready for mounting.

Figure 4 is a plan view thereof.

Referring to the drawing in detail, the traction device embodies a plate 5, which is formed with hooks 6 extending laterally from one end thereof, the portion of the plate 5, adjacent to the hooks 6 being substantially wide, to add strength and durability to the fastener.

A hook indicated by the reference character 7 extends outwardly from the opposite end of the plate 5, at a point intermediate the side edges thereof, the hook being formed by slitting this end of the plate 5. The portions of the plate 5 at opposite sides of the hook 7, provide arms 8 that extend inwardly in a direction opposite to the direction of the hook 7, where they may pass into one of the openings of the usual pressed steel wheel, commonly used in truck construction.

The chain sections, which are indicated by the reference character 9, have one of their respective ends hooked into the hooks 6 of the plate 5, the opposite ends of the chains being positioned within the hooks 10 of the plate 11, which cooperates with the plate 5 in holding the chain sections 9 to the wheel.

This plate 11 is also formed with inwardly extended arms 12, that overlie the opposite edge of the felloe of the wheel 13.

Links 14 have pivotal connection with the plate 11, at 15, the opposite ends of the links 14 being formed with openings to receive the laterally extended pins 16 carried by the extensions 17 of the lever 18. An arm indicated at 19 extends from one end of the lever 18, and has pivotal connection with the links 20, the opposite ends of the arms being held in spaced relation with respect to each other, by means of the spacers 21. These spacers 21 afford means whereby the links 20, which provide the connection between the lever 18 and plate 5, may be positioned over the hook 7 of the plate 5, and since these spacers 21 are arranged in spaced relation with each other, it will be seen that an adjustment between the links 20 and plate 5 is provided, to the end that the emergency traction chain may be used in connection with chain sections of various lengths, thereby adapting the emergency chain for use in connection with tires of various diameters.

From the foregoing it will be seen that due to the construction shown and described, should it become necessary to mount a traction chain, it is only necessary to position the arms 8 of the plate 5, within an opening of the wheel, an opening in the present showing being indicated by the reference character A. The chain sections are now passed around the tread of the tire and extensions 20 are extended through the opening in which the arms 8 are positioned, but from the inside of the wheel. Links of the chain sections 9 are now hooked into the hooks 10 of the plate 11. The proper spacer 21 is now positioned over the hook 7 of the plate 5, and the lever 18 is swung to a position in parallel relation with the upper edges of the extensions 20 as shown by Figure 1 of the drawing, which draws the chains taut on the wheel. It will be seen that the pull directed to the lever, as the traction chains contact with the road surface, will be directed in such a way that the lever will be held in its active or closed position.

To remove the chain, it is only necessary to swing the lever upwardly. This movement will result in a lengthening of the chain, to the end that the spacer positioned over the hook 7, may be readily disengaged with the hook.

I claim:

A fastener for fastening the ends of tire chains, comprising a hook member connected to one end of the chain, a plate secured to the opposite end of the chain, links pivotally connected with the plate, a lever pivotally connected with the links and having a hook formed at one end thereof, arms cooperating with the lever, spacers holding the arms in spaced relation with each other, one of said spacers adapted to be positioned over the hook of the hook member, said hook of the lever adapted to engage the spacer at the opposite end of the arms, and said lever adapted to draw the ends of the chain together, when it is moved downwardly to its locked position.

MARTIN H. SUNDEM.